Dec. 26, 1967  W. J. FISHER  3,360,195
BEARING-ANGLE DEVICE
Filed Aug. 19, 1966  2 Sheets-Sheet 1

INVENTOR.
WILLIAM J. FISHER
BY
ATTORNEYS

INVENTOR.
WILLIAM J. FISHER
BY
ATTORNEYS

| # United States Patent Office 3,360,195
Patented Dec. 26, 1967

3,360,195
BEARING-ANGLE DEVICE
William J. Fisher, 745 Martin St.,
Monterey, Calif. 93940
Filed Aug. 19, 1966, Ser. No. 573,606
1 Claim. (Cl. 235—78)

ABSTRACT OF THE DISCLOSURE

More particularly, the invention relates to a bearing angle computer for engineers and provides means for visualizing the relationship between bearing and deflections. A series of formulas are provided to make accurate calculations. It further provides direct reading of rough answers without resort to any calculations. The computer includes four concentrically pivoted dials of decreasing size namely: a quadrant dial, a backsight dial, a deflection dial and an indicator dial. The quadrant dial has two sets of indicia comprising outer compass points and inner four concentric rows of symbols each of which extends for 90 degrees. The backsight dial is transparent and has two lines crossing the center at right angles to each other.

---

This invention relates to a bearing angle calculating device and more particularly relates to a simple device which can be used by engineers, surveyors, teachers and the like to make quick and accurate calculations of bearing angles from a set of compass bearings. The device is simple to use and readily adaptable for field computations of bearings and deflections. It is particularly suitable for use in classroom instruction since it can be quickly mastered by the average student and the student can immediately see for himself what has taken place and visualize the relationship between bearings and deflections. The device provides a series of formulas for making an accurate calculation of a deflection or bearing and in addition, provides a direct reading of the approximate answer so that it is easy to check the calculations and to at least avoid making a gross mistake. For rough answers, the device yields an immediate approximate answer without resort to any calculations.

In the drawings forming a part of this application:

Figure 1:
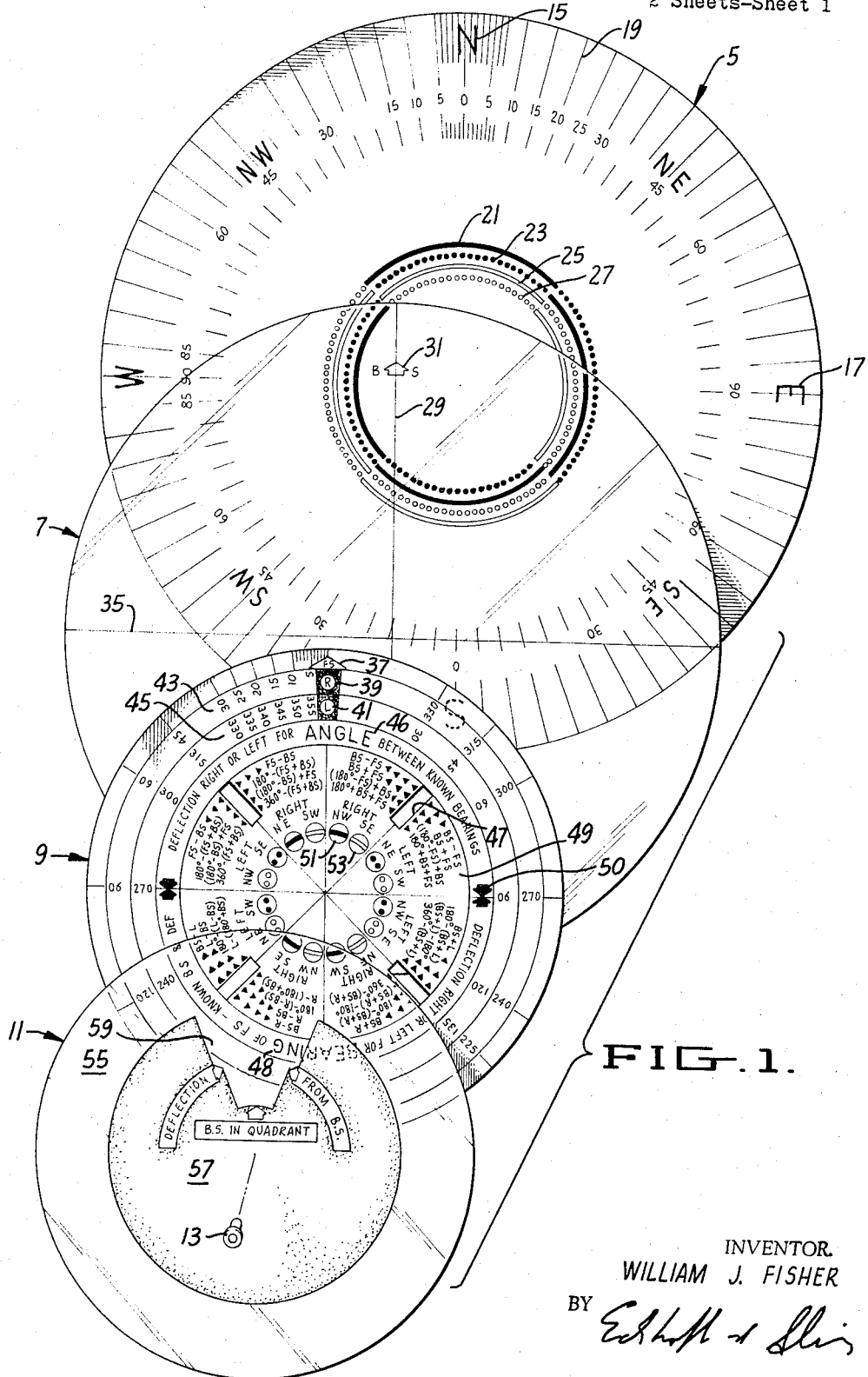
FIGURE 1 is an exploded view of a device embodying the present invention.

Turning now to a description of the drawing by reference characters, and referring particularly to FIGURE 1, the device includes four concentric dials of decreasing size namely a quadrant dial 5, a backsight dial 7, a deflection dial 9 and an indicator dial 11. The dials are pivoted through their centers by means of a pin 13, so that the upper three dials can be rotated relatively to the quadrant dial.

The quadrant dial 5 has two sets of indicia, the outer of which consists of the usual compass points as at 15 and 17 with suitable degree markings therebetween as at 19. The inner indicia comprises 4 concentric rows of symbols, each of which extends for 90° and each of which is staggered with respect to the symbols on the adjacent 90° sectors. These can be of various colors or arbitrary marks so that they can be readily distinguishd. In the embodiment of the invention shown, one set comprises a solid line 21, the second comprises a series of filled-in dots 23, the third comprises a hollow-line 25 and the fourth comprises open dots 27.

Figures 2, 3:
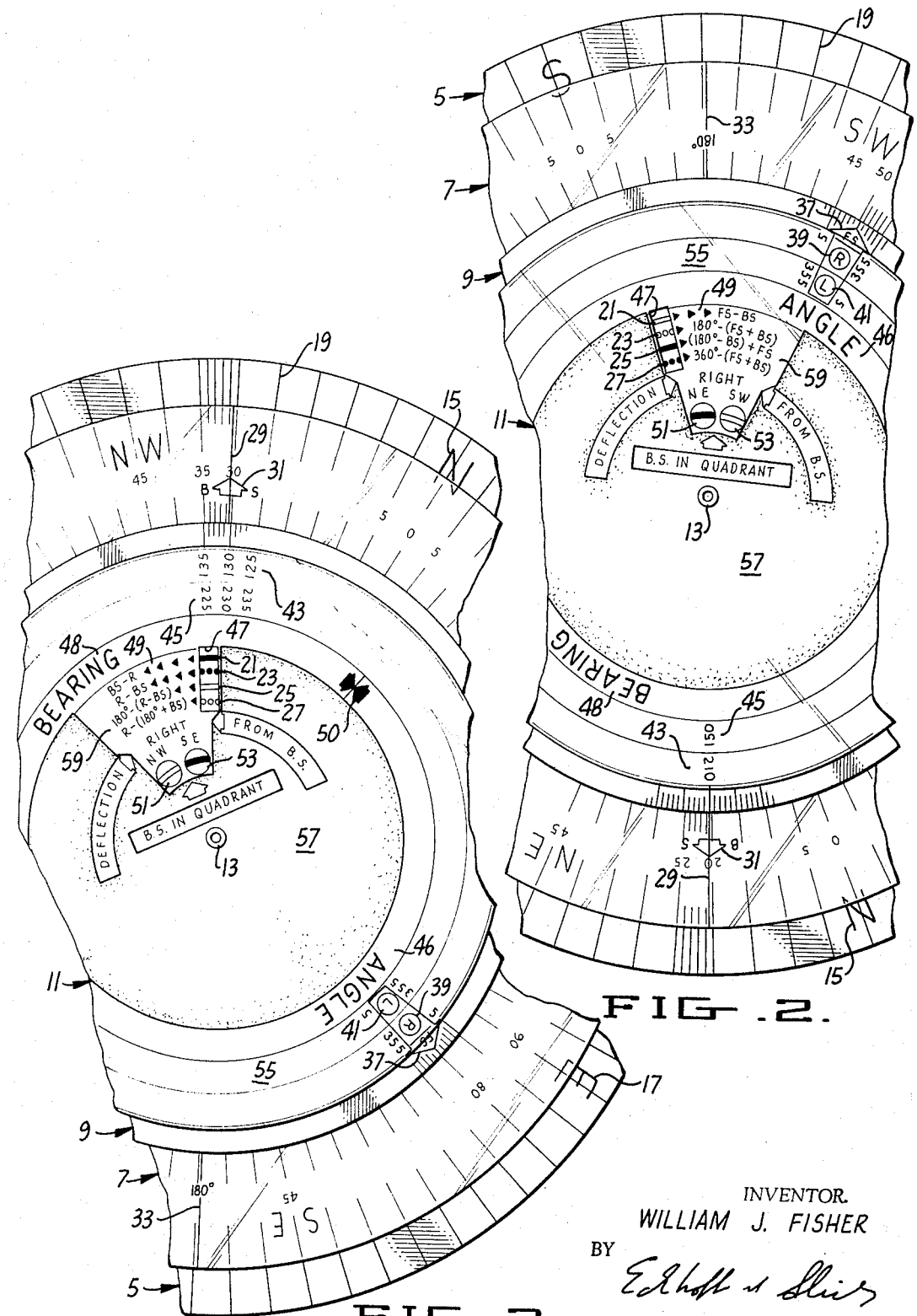
FIGURE 2 is an enlarged partial view of the assembled device shown in FIGURE 1 indicating the dials as they would be turned in solving a typical problem as is hereinafter set forth in detail.
FIGURE 3 is a similar view showing the dials turned to solve another problem.

The backsight dial 7 is made of a transparent material and has a line 29 inscribed completely across the face thereof passing through the center, one end of the line having an arrow 31 to indicate a backsight while the opposite end of the line may be inscribed 180° as at 33 (not shown in FIGURE 1 but illustrated in FIGURE 3). In addition, a second line 35 may be inscribed at 90° to the line 29.

The deflection dial 9 has an indicating arrow 37 indicating a foresight, which arrow is adapted to line-up with the outer indicia on dial 5. Arrow 37 has a right indicator 39 and a left indicator 41 and two rows of angle markings namely a counterclockwise row 43 opposite the right indicator and clockwise markings 45 opposite the left indicator. Below this are the words "Angle" at 46 and "Bearing" at 48, with arrows as at 50 to indicate that each word is applicable through 180° of the dial. Dial 9 also has four apertures as at 47 which apertures are spaced 90° and which reveal the four rows of indicia 21, 23, 25 and 27 on dial 5. Adjacent to the apertures and in line with the four rows of indicators on dial 5 are the formulas 49, for calculating angles and foresights, i.e., bearings. Also, dial 9 includes 8 pairs of markers as at 51 and 53 indicating which of the formulas to use depending on which indicator shows up through the aperture 47.

The outer dial 11 is made of a transparent material as at 55 but has the larger portion of its surface covered by an opaque material 57 leaving a clear aperture 59 of about 45°. Dial 11 also has the wording shown in the drawing, namely a center arrow with the designation "B.S. in quadrant" and has arrows at the left and right sides of the aperture with the designation: "Deflection from B.S."

The device of the present invention is adapted to find either the angle between two known bearings or to find a bearing when one has a known backsight bearing and a known deflection angle.

In order to find the angle between two known bearings, one first places the backsight dial 7 on one known bearing of the quadrant dial 5. Then one places the deflection dial arrow on the other known bearing on the quadrant dial. Next one places the indicator dial window over the correct backsight quadrant and correct deflection desired in the area marked "Angle" on dial 9. One can then read the formula pointed to from the slot in the deflection dial. Further, one can read the approximate answer on the dial marked "Right" at the backsight. These operations are illustrated by the following example and also by reference to FIGURE 2 where the dials are shown set to this example.

*Example 1*

Known: N. 20°30′45″ E., S. 50°25′10″ W. Deflection right.

1st. Place B.S. on N. 20°30′45″ E. (approximately)
2nd. Place F.S. on S. 50°25′10″ W. (approximately)
3rd. Place indicator dial window on deflection dial, in ANGLE area, to read:

Deflection RIGHT from B.S.

NE   SW

B.S. in quadrant 

4th. Since the B.S. is obviously in the NE. quadrant, the formula by the solid line is the one to use, namely (180°−B.S.)+F.S.
5th. Use the formula to obtain answer:

$(180°-20°30'45'')+50°25'10''=(159°29'15'')$
$+50°25'10''=209°54'25''$

A similar sequence of operations is employed if one wishes to find a bearing with a known backsight bearing and a known deflection angle. To do this, one first places the backsight dial arrow on a known bearing on the quadrant dial. One then places the deflection dial with a known deflection angle, right or left, in line with the backsight arrow. Next one places the indicator dial window over the correct backsight quadrant and correct deflection desired in the "Bearing" area. One can now read the formula pointed to on the slot in the deflection dial. After making the calculations, one can read off of the quadrant dial the approximate answer. The following example illustrates this calculation and FIGURE 3 shows the dials properly set for making this calculation.

*Example II*

Known: B.S.: N. 30°25'15" W. Deflection right 130°15'19".

1st. Place B.S. dial arrow on approximately N. 30°25'15" W. on quadrant dial.

2nd. Place deflection dial R on approximately 130°15'19" in line with B.S. arrow.

3rd. Place indicator dial window on deflection dial, in BEARING area, to read:

Deflection RIGHT from B.S.

4th. Since the B.S. is in the NW. quadrant (hollow line) read formula $180°-(R-BS)$ 5th. Use formula $180°-(130°15'19''-30°25'15'')$
$=180°-(99°50'04'')=$ S. 80°09'56" E.

It is obvious that many departures can be made from the precise arrangement shown without departing from the spirit of this invention.

I claim:

A bearing angle calculating device comprising in combination a series of four concentric dials of decreasing size pivoted together at the centers thereof whereby the dials can rotate relative to each other, said dials comprising from the bottom dial up: a quadrant dial, a backsight dial, a deflection dial, and an indicator dial, said quadrant dial having outer and inner sets of indicia, said outer set consisting of compass points adjacent the periphery and degree markings therebetween, said inner indicia comprising four concentric rows of four sets of indicia, each of which extend for 90 degrees and each of which are staggered with respect to the indicia on the adjacent 90 degrees sectors; said backsight dial being transparent and having a line completely across the face thereof and passing through the center, one end of said line having an arrow to indicate a backsight; said deflection dial having an indicating arrow indicating a foresight; and which is adapted to line up with the outer indicia on said quadrant dial, said arrow having a right indicator and a left indicator and two rows of angle markings namely, a counterclockwise row opposite the right indicator and a clockwise marking opposite the left indicator, said deflection dial further including four apertures which are spaced 90 degrees, said apertures being positioned over and revealing the four rows of indicia on said quadrant dial, said deflection dial also carrying formulas adjacent the apertures and in line with the four rows of indicators and eight pairs of concentrically arranged markers to indicate which of the formulas to use depending on which indicia shows up through the aperture, and said indicator dial being opaque with the exception of a sector of about 45 degrees, and revealing therethrough, in one position, only one of said pairs of markers along with only one of said apertures which in turn reveal the indicia on said quadrant applicable thereto.

References Cited

UNITED STATES PATENTS 2,418,933 4/1947 Hill _____ 235—78
3,034,713 5/1962 Kuzenko _____ 235—78
3,126,151 3/1964 Barry _____ 235—78

RICHARD B. WILKINSON, *Primary Examiner.*

STEPHEN J. TOMSKY, *Examiner.*

STANLEY A. WAL, *Assistant Examiner.*